(12) United States Patent
Parameswaran et al.

(10) Patent No.: US 7,634,776 B2
(45) Date of Patent: Dec. 15, 2009

(54) MULTI-THREADED PROCESSING DESIGN IN ARCHITECTURE WITH MULTIPLE CO-PROCESSORS

(75) Inventors: Sankaranarayanan Parameswaran, Karnataka (IN); Sriram Sethuraman, Karnataka (IN); Manish Singhal, Karnataka (IN); Dileep Kumar Tamia, Karnataka (IN); Dinesh Kumar, Karnataka (IN); Aditya Kulkarni, Karnataka (IN); Murali Babu Muthukrishnan, Karnataka (IN)

(73) Assignee: Ittiam Systems (P) Ltd., Bangalore, Karnataka (IN)

( * ) Notice: Subject to any disclaimer, the term of this patent is extended or adjusted under 35 U.S.C. 154(b) by 907 days.

(21) Appl. No.: 11/127,687

(22) Filed: May 12, 2005

(65) Prior Publication Data

US 2005/0262510 A1    Nov. 24, 2005

Related U.S. Application Data

(60) Provisional application No. 60/570,720, filed on May 13, 2004.

(51) Int. Cl.
    *G06F 9/46* (2006.01)
    *G06F 9/30* (2006.01)
    *G06T 1/20* (2006.01)

(52) U.S. Cl. .......... 718/105; 712/201; 345/506
(58) Field of Classification Search .......... 718/105; 712/201; 345/506
    See application file for complete search history.

(56) References Cited

U.S. PATENT DOCUMENTS

| | | | | |
|---|---|---|---|---|
| 5,289,577 A | * | 2/1994 | Gonzales et al. | 345/506 |
| 6,412,062 B1 | * | 6/2002 | Xu et al. | 712/40 |
| 6,802,066 B1 | * | 10/2004 | Carden et al. | 719/312 |
| 7,007,031 B2 | * | 2/2006 | MacInnis et al. | 707/101 |
| 7,424,003 B2 | * | 9/2008 | Fisher et al. | 370/348 |
| 2005/0085928 A1 | * | 4/2005 | Shani | 700/18 |

* cited by examiner

*Primary Examiner*—Meng-Ai An
*Assistant Examiner*—Camquy Truong
(74) *Attorney, Agent, or Firm*—Prakash Nama; Global IP services, PLLC

(57) ABSTRACT

A method for designing a multi-threaded processing operation that includes, e.g., multimedia encoding/decoding, uses an architecture having multiple processors and optional hardware accelerators. The method includes the steps of: identifying a desired chronological sequence of processing stages for processing input data including identifying interdependencies of said processing stages; allotting each said processing sage to a processor; staggering the processing to accommodate the interdependencies; selecting a processing operation based on said allotting to arrive at a subset of possible pipelines that offer low average processing time; and, choosing one design pipeline from said subset to result in overall timing reduction to complete said processing operation. The invention provides a multi-threaded processing pipeline that is applicable in a System-on-Chip (SoC) using a DSP and shared resources such as DMA controller and on-chip memory, for increasing the throughput. The invention also provides an article which is programmed to execute the method.

22 Claims, 6 Drawing Sheets

MULTI-THREADED PROCESSING DESIGN IN ARCHITECTURE WITH MULTIPLE CO-PROCESSORS

RELATED APPLICATIONS

Benefit is claimed under 35 U.S.C. 119(e) to U.S. Provisional Application Ser. No. 60/570,720, entitled "Multi-threaded processing pipeline design for maximizing the multimedia encoding/decoding throughput in an architecture with multiple co-processors and/or hardware accelerators" by Shankaranarayanan Parameswaran et al, filed May 13, 2004, which is herein incorporated in its entirety by reference for all purposes.

FIELD OF THE INVENTION

This invention generally relates to multi-threaded pipeline design in data handling, and more particularly to multi-threaded pipeline design in multimedia codec architecture that uses multiple co-processors and optional hardware accelerators.

BACKGROUND OF THE INVENTION

Design engineering has advanced by leaps and bounds with the effort by semiconductor vendors supporting development of special purpose software and development of new firmware in operating systems. Even before the availability of ASICs (application specific integrated circuits), design engineers spared no effort in building prototype boards and to enable software engineers to build required codes and make innovations in how to use available resources efficiently. Another available tool for design engineers comprises hardware accelerators which have been used profusely to speed design and simulation work. With designs getting larger and more complex, there is now added impetus to use the SoC (system-on-a-Chip) approach to cater to increasing design needs and demands. Compelling advantages in terms of cost and flexibility offered by SoC solutions, that pack a DSP with multiple minimally programmable coprocessors or hardware accelerators under the control of that DSP, have made such SoCs very popular. Real time multimedia processing, which usually involves sequential data dependencies, poses technical challenges in realizing the design on such a multi-processor architecture owing to shared resource limitations (such as on-chip memory, DMA controller) and variations in the processing complexity from one processing stage to the other. In design efforts involving especially multimedia processing, where multiple co-processors and or hardware accelerators are used, there is a need to ensure that an efficient and flexible use of the resources is made in terms of the allocation of processing tasks and the time taken to complete the allocated tasks.

SUMMARY OF THE INVENTION

One embodiment of the invention resides in a method for designing a processing operation in an architecture that uses multiple processors, comprising the steps of: identifying a chronological sequence of processing stages for processing input data including identifying interdependencies of said processing stages; allotting each said processing stage to a processor; staggering the processing to accommodate said interdependencies; selecting a subset of possible pipelines that offer low average processing time, based on said allotment; and, choosing one design pipeline that offers overall timing reduction in presence of statistical variations to complete said processing operation.

A second embodiment of the invention resides in a method for achieving efficient parallel processing multi-thread-design-capability in architecture which uses multiple processor units and is capable of handling multi-media encoding/decoding, comprising the steps of: identifying different processing stages for and their interdependencies during processing input data; assigning each said processing stage to a suitable processing unit; staggering said processing stages to accommodate said interdependencies; assigning a buffer, by mapping, to each processing unit for each processing stage; ascertaining processing time needed, on respective mapped processing units, for fixed complexity processing stages and varying complexity processing stages; based on an average processing time and other predetermined constraints, selecting a subset of possible timelines that offer a best average processing time; and, from the subset of possible timelines, selecting a single design pipeline that offers the best timing.

Another embodiment resides in an article comprising a storage medium having instructions thereon that when executed by a computing platform, result in execution of a method as above. The invention can be applied in any scenario where multiple co-processors and/or accelerators are used. In particular, and as described hereinafter, the invention is applied in multimedia processing involving both video and audio processing, offering flexibility and ensuring efficient use of available resources to result in a minimum idle time for key processors.

In video compression, as described in one embodiment, spatial and temporal prediction of coding parameters from already coded macroblock parameters is employed to reduce the redundancy and improve the compression efficiency. Such prediction steps introduce dependencies between the various processing stages. Given a heterogeneous set of co-processors and/or hardware accelerators that are well suited to perform specific processing stages respectively, one embodiment as described hereinafter provides a multi-threaded processing pipeline that offers a very high processing throughput. This requires ensuring that the co-processor (s) or accelerator(s) that is(are) on the critical path is(are) idle for as short a time as possible, while taking care of constraints due to spatial dependencies in the processing chain, internal memory available for buffering, shared memory design (e.g., a particular memory is single ported and can be accessed by only a single accelerator at a time, or a unit capable of parallel processing is restricted by the number of read/write ports), and cycle overheads involved in setting up each co-processor/accelerator.

In audio compression, redundancy is reduced by exploiting the frequency characteristics of audio data. The raw audio samples are grouped into frames and these frames of data are subject to frequency analysis to extract only those frequencies that would be perceptible to the user. Filtering techniques are employed to reduce the amount of audio data to be coded. This data is further compressed using transform-coding and variable length coding. Such a coding scheme has dependency between the various processing stages. Therefore on a multi-processor environment the challenge lies in designing a multi-threaded processing pipeline that increases the processing throughput. Also the above-mentioned constraints like shared memory design, minimal idle time of the various processing units need to be taken into account to design an efficient processing pipeline for audio processing.

Described hereinafter by way of example is an architecture that has a DSP (digital signal processor) sub system that consists of a master DSP controlling the co-processors/accelerators, a programmable co-processor with multiple multiply-and-accumulate (MAC) units that are suited for vector/array processing, an optional hardware accelerator tailored for variable length coding/decoding, an optional hardware accelerator tailored for quantization and dequantization of DCT (discrete cosine transform) coefficients, shared memory buffers, and a DMA engine that can move data from/to external memory to/from the shared memory buffers. In the described example, three shared memory buffers are assumed. In some cases, multiple shared memory buffers may all share the same address space, such that only one is visible from the processor/co-processor/DMA (direct memory access) engine.

It is understood that modifications in the method and the article containing a storage medium as depicted above are possible without departing from the thrust of the inventive process and are within the ambit of the invention. It is also to be understood that acronyms used herein are to be understood as explained in the text, and other acronyms should be understood as commonly known in the art.

BRIEF DESCRIPTION OF THE DRAWING

Embodiments of the invention will now be described, by way of example only, with reference to the accompanying drawings in which.

DETAILED DESCRIPTION OF THE INVENTION

The description that follows provides a detailed exemplary approach for designing a multi-thread processing operation in an architecture that uses multiple processors and/or hardware accelerators with a view to obtaining improved throughput from the process without foregoing the process requirements and predetermined constraints. Even though the inventive approach is applicable to any general situation wherein multiple processors are used, the embodiments described herein below are directed by way of example and not limitation, to a processing operation involving multimedia processing including video and audio processing.

Figure 1:
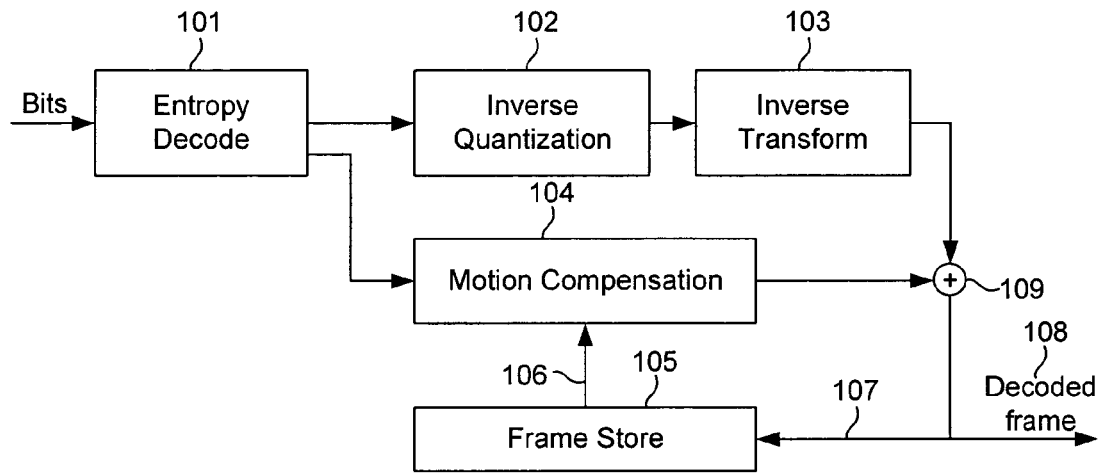
FIG. 1 illustrates a block diagram of a typical video decoder.

FIG. 1 illustrates a block diagram of a typical video decoder including an entropy decoder block 101 that receives bits. Processing continues with inverse quantization in block 102, inverse transform in block 103, and motion compensation in block 104. Outputs from blocks 103 and 104 go to the adder at 109 and decoded frames 108 are put out. Decoded frames are also sent to the frame store 105. A feedback from frame store 105 to the motion compensation block 104 is provided through feedback line 106. Additional details of operation of the individual blocks should be intelligible to those skilled in the art.

Figure 2:
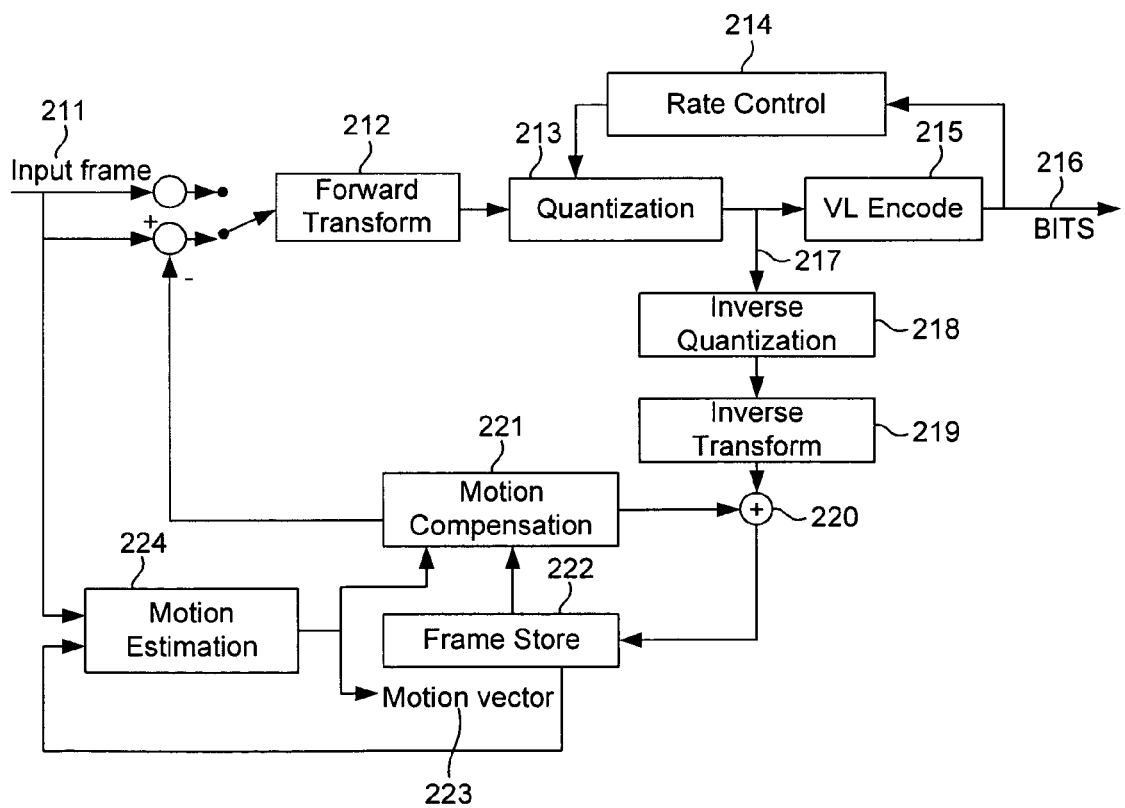
FIG. 2 illustrates a block diagram of a typical video encoder.

FIG. 2 illustrates a block diagram of a typical video encoder in the context of the invention. Input frames arrive at 211, and are processed at motion estimation block 224, motion compensation block 224, forward transform at block 212, quantization at block 213, inverse quantization at block 217, and inverse transform at block 219. An adder/mixer at 220 receives signals from blocks 219 and 221 and sends an output to the frame store at 222. The motion vector block provides a motion vector output at 223. Variable length encoding shown at block 215 can happen at any stage following quantization and produces bits at 216. Additional details of operation of the individual blocks should be intelligible to those skilled in the art.

Figure 3:
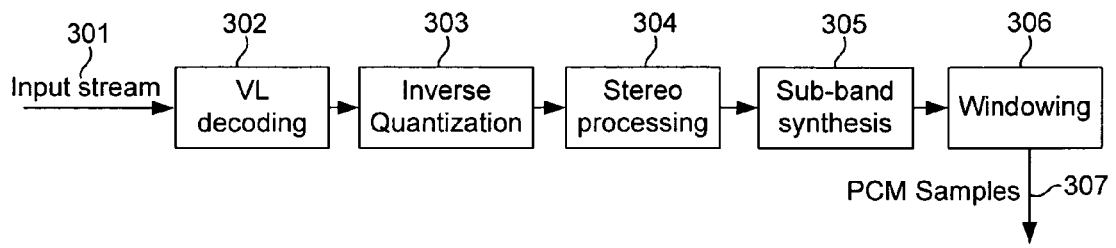
FIG. 3 illustrates a block diagram of a typical audio decoder.

FIG. 3 illustrates a typical block diagram of a typical audio decoder wherein an input stream 301 is decoded at variable length decoding block 302, subjected to inverse quantization at block 303 for further processing. PCM (pulse code modulation) samples are produced at output 307. Additional details of operation of the blocks in FIG. 3 should be intelligible to those skilled in the art.

Figure 4:
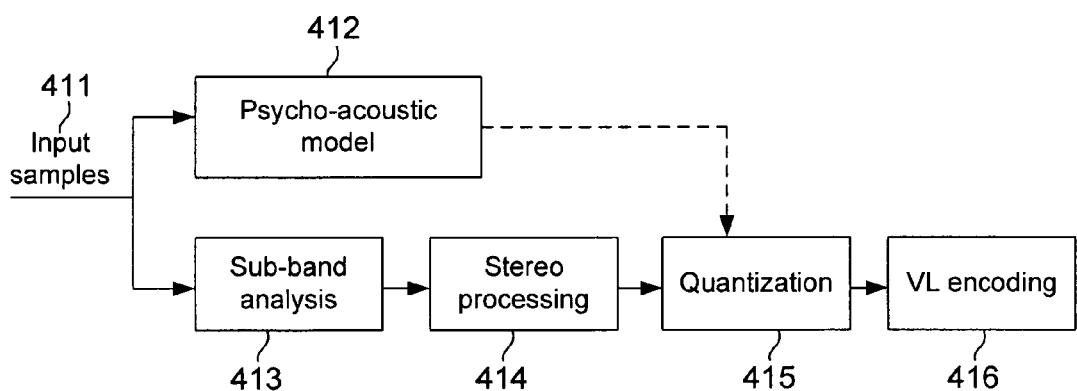
FIG. 4 illustrates a block diagram of a typical audio encoder.

FIG. 4 illustrates a block diagram of a typical audio encoder in the context of the invention. Input samples arrive at 411 and undergo psycho-acoustic modeling at block 412. In a parallel path, input samples undergo sub-band analysis at block 413 and stereo transformation at block 414, to proceed to quantization at 415 and variable length encoding at 416. Further details of the individual processes in the blocks of FIG. 4 are intelligible to those skilled in the art.

Figure 5:
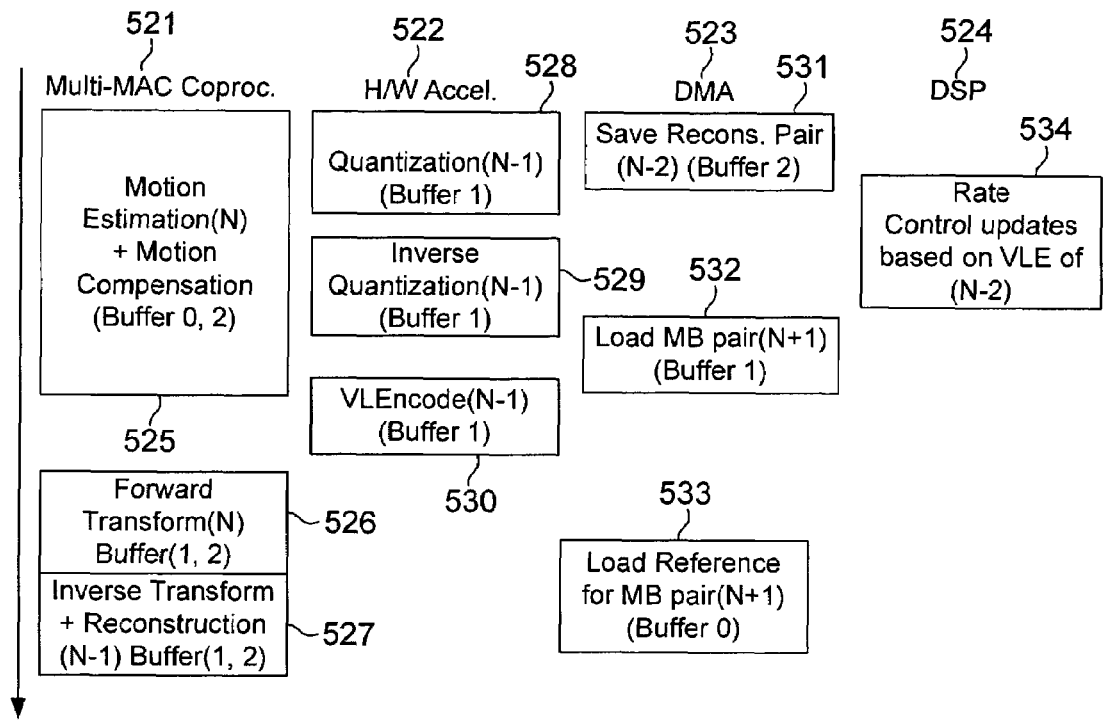
FIG. 5 illustrates a block diagram of pipeline flow for a video encoder.

FIG. 5 illustrates an exemplary embodiment of a design pipeline flow for a video encoder showing motion estimation/motion compensation block 525, forward transform block 526, quantization block 528, inverse quantization block 529, and variable length encoder block 530. FIG. 5 also shows under direct memory access (DMA) 523, three buffers 531, 532, and 533, as well as a digital signal processor 524 showing rate control updates 534. Further details of operation in the blocks of FIG. 5 will be intelligible to those skilled in the art. The following exemplary design aspects of a video encoder are noted in the context of FIG. 5:

Design Constraints in Video Encoder:
 1) The Motion Estimation for a macroblock can only happen after that of the macroblock preceding it. This is the case since the motion vectors of a macroblock are used as predictors in a succeeding macroblock.
 2) In the illustrated example, the following sequence of operations have to occur in the order mentioned:
   Motion Estimation->Motion Compensation->Forward Transform->Quantization->Inverse Quantization->Inverse Transform->Reconstruction. However VL-Encode can happen at any stage following the quantization.

Design of Multi-Thread Pipeline for Video Encoder:

The following exemplary optimizations were carried out in designing the multi-thread pipeline:
 1) The minimum processing unit was converted to macroblock pairs instead of macroblocks. This step was motivated by two factors; the DMA load and stores from/to frame buffers would take the same time for two adjacent macroblocks or one macroblock. The other advantage gained was flexibility in the motion estimation process: less precise motion estimation could be carried out for every alternate macroblock and this could be configurable.

2) The rate control is used as a feedback mechanism. The bits consumed by a macroblock pair would be used to update the quantizer step-size for the next pair. However since this is the prerogative of the user and not dictated by standards, the feedback was delayed by one pair to allow for better pipeline flexibility.

Figure 6:
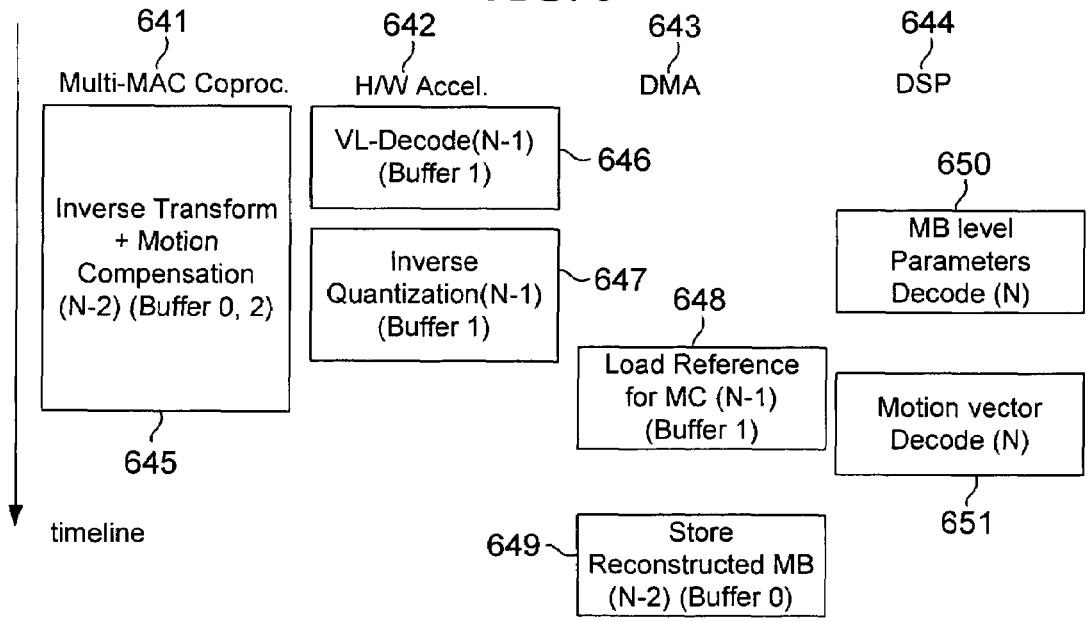
FIG. 6 illustrates a block diagram of pipeline flow for a video decoder.

FIG. 6 illustrates a block diagram of an exemplary embodiment of a design pipeline flow for a video decoder, showing a multi-MAC coprocessor 641, and inverse transform/motion compensation buffer 645. Also shown under accelerator 642, is variable length decode buffer 646 and inverse quantization buffer 647. Shown under DMA 643, are buffer 648 for load reference for motion compensation, and buffer 649 for store-reconstructed MB. Under DSP 644 in FIG. 6 are shown MB level parameter decoder 650 and motion vector decoder 651. Further functional details of the foregoing components are intelligible to those skilled in the art. The following exemplary design aspects are noted for multi-thread pipeline design of video decoder of FIG. 6:

Design Constraints in Video Decoder:
1. The Bit-stream parsing for one macro-block can start only after the variable length decoding of the previous MB is done. Within an Intra macro-block the inverse DC-AC prediction for the blocks can not be done in parallel because the prediction depends on the blocks previously decoded
2. The following sequences of operations have to necessarily occur in the order mentioned:
Seq1: MB-level Parameters Decode->Motion Vectors Decode->VL-Decode.
Seq2: Inverse Quantization->Inverse Transform->Motion Compensation.
Seq1 depends on the bit-stream parsing. So any operation in seq1 for one macro-block cannot be done until all operations in Seq1 for the previous macro-block are over.

Design of multi-thread pipeline for video-decoder: (1). The design pipeline is spread over 3 MBs. (2). The various tasks have been scheduled on different processors as shown in FIG. 6.

Figure 7:
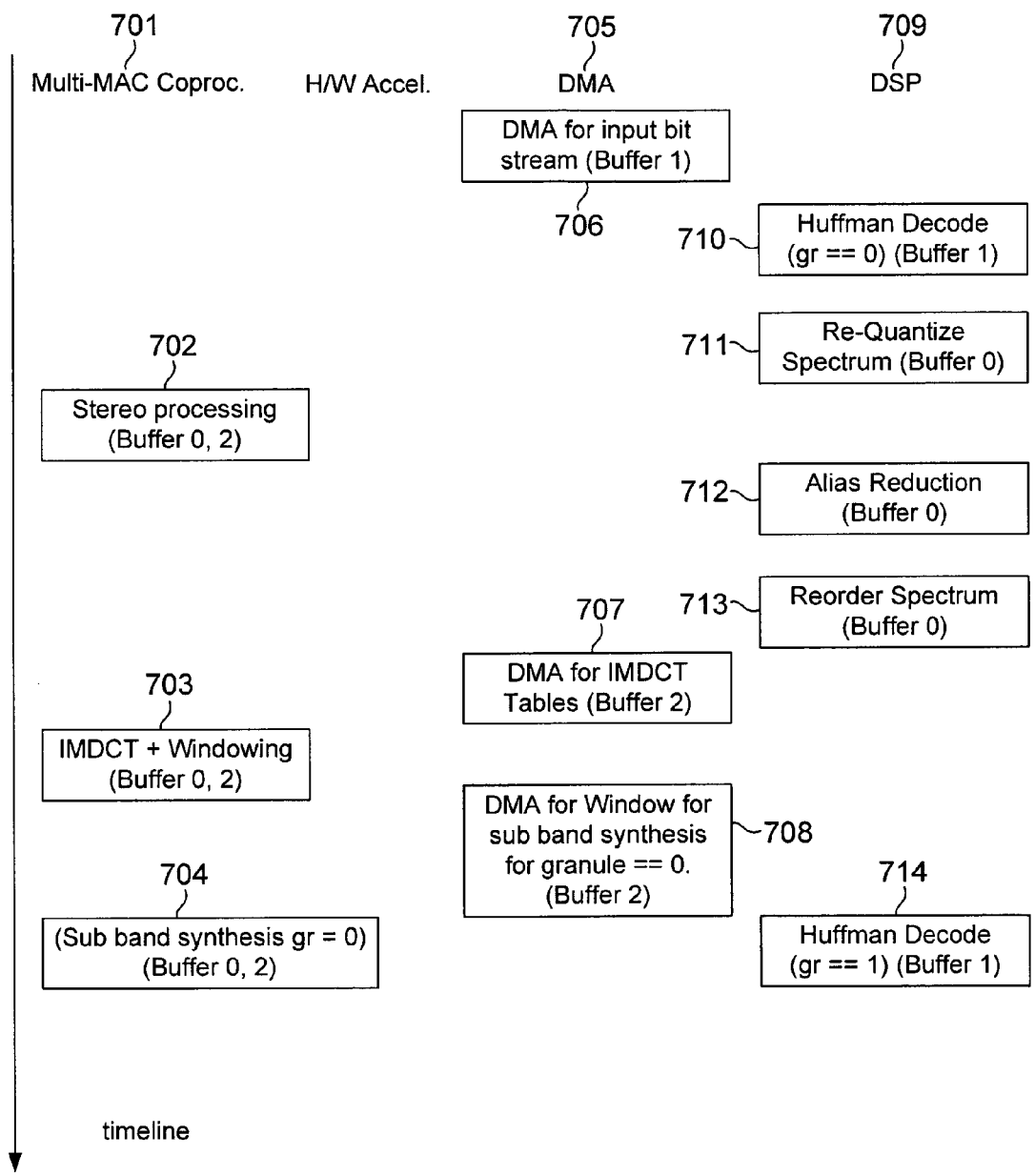
FIG. 7 illustrates a block diagram of pipeline flow for an audio decoder.

FIG. 7 illustrates a block diagram of an exemplary embodiment of a pipeline design flow for an audio decoder, showing under multi-MAC coprocessor 701, three buffers, i.e., signal processing buffer 702, IMDCT (inverse modified discrete cosine transform) and windowing buffer 703, and sub-band synthesis group buffer 704. Shown in FIG. 7 under DMA 705 are three buffers, i.e., DMA for input stream buffer 706, DMA for IMDCT Tables buffer 707, and DMA fir Window for sub band synthesis buffer 708. Also shown in FIG. 7 under DSP 709 are buffers, Huffman decode granule 0 buffer 710, re-quantize spectrum buffer 711, alias reduction buffer 712, recorder spectrum buffer 713, and Huffman decode granule 1 buffer 714. The functional details of the foregoing components will be intelligible to those skilled in the art. The following are exemplary design aspects of a design for a multi-thread pipeline design for an audio decoder of FIG. 7:

Design Constraints in Audio Decoder:
1. The Bit-stream parsing for one frame/channel/granule can start after the variable length decoding of the previous frame/granule is done.
2. The following sequences of operation have to occur in the order mentioned:
Seq1: Header Parameters Decode->VL-Decode.
Seq2: Inverse Quantization->Inverse Transform->windowing.
Seq1 depends on the bit-stream parsing. So any operation in seq1 for one frame/channel/granule cannot be done until all operations in Seq1 for the previous frame/channel/granule are over.

Design of Multi-Thread Pipeline:

The following exemplary optimizations were carried out in designing the multi-thread pipeline:
1) The minimum processing unit was converted to frames and the multi-threading was carried out at the level of granule or channel.
Most of the filtering operations like polyphase filtering, windowing and inverse transform require staggered accesses of the input data and tables. These processing blocks were converted into a form where they can be written in the form of linear filters by either padding the coefficients to use circular addressing or by collapsing two processing stages to a single stage such that the access becomes linear or circular.

Figure 9:
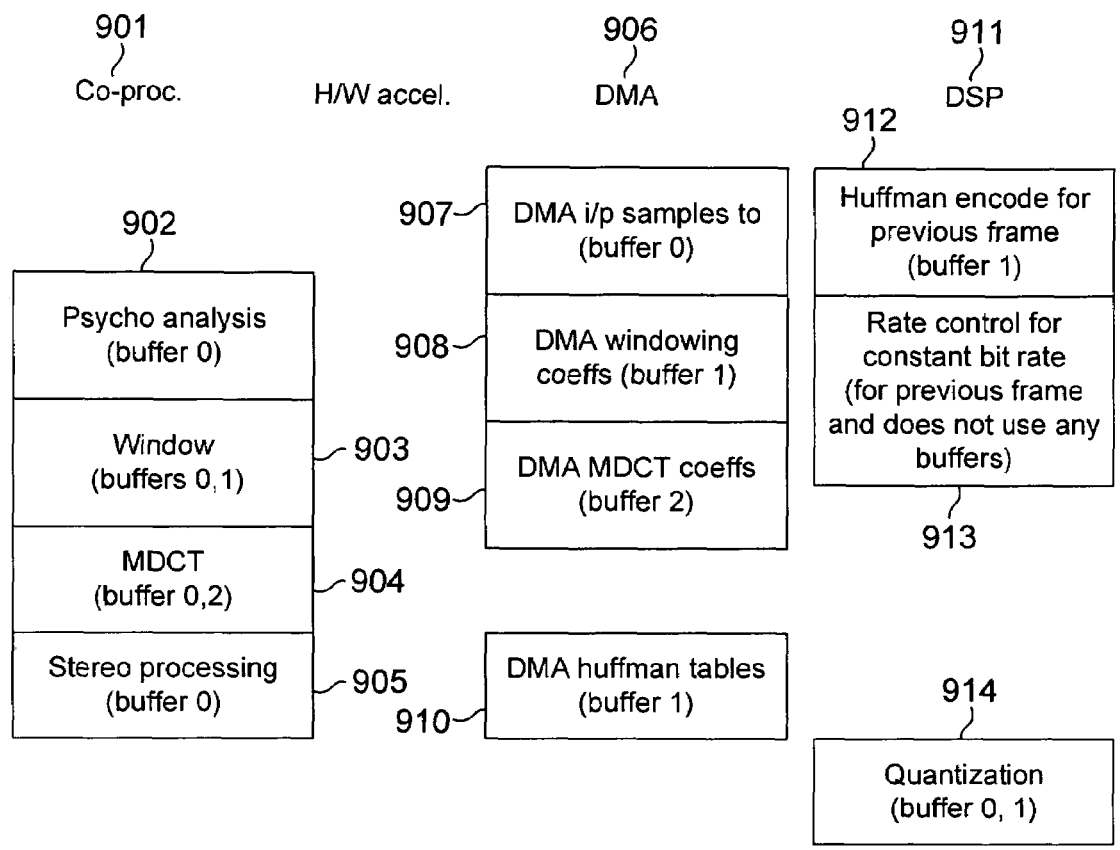
FIG. 9 illustrates a block diagram of pipeline flow for an audio encoder.

FIG. 9 shows a block diagram of an audio encoder used in the context of the invention. As shown, the audio encoder has a co-processor 901, psycho analysis buffer 902, MDCT buffer 904, and a stereo processing buffer 905. The audio encoder includes a DMA having the components DMA i/p samples buffer 907, DMA window coefficient buffer 908, DMA MDCT coefficients buffer 909, and a DMA Huffman tables buffer 910. Also included in the audio encoder of FIG. 9 are Huffman-encode-for previous frame buffer 912, rate control 913 without a buffer, and a quantization buffer 914. Functional details and typical architecture of the foregoing components are intelligible to those skilled in the art. With respect to an inventive embodiment directed to an audio encoder, the following design aspects applicable for multi-thread design pipeline are to be noted:

Design Constraints in Audio Encoder:
1. The bit allocation for one frame can happen only after the encoding of the previous frame has been completed.
2. The following sequence of operations have to necessarily occur in the order mentioned:
Psycho acoustic modeling->Filtering (masking)->sub band decomposition->Transform->Quantization->VL encoding.

Design of Multi-Threaded Pipeline for Audio Encoder:

The following optimizations were carried out in designing the multi-thread pipeline:
1) The minimum processing unit was converted to frames and the multi-threading was carried out at the level of granule or channel.
2) Most of the filtering operations like polyphase filtering, inverse transform and windowing require staggered accesses of the input data and tables. These processing blocks were converted into a form where they can be written in the form of linear filters by either padding the coefficients to use circular addressing or by collapsing two processing stages to a single one such that the access becomes linear or circular.

In light of the foregoing illustrations and description, an exemplary method for selecting a multi-threaded processing pipeline design for architecture as described above works as follows:
1. The various processing stages that need to happen on a basic processing unit are identified along with their inter-dependencies. Multiple mutually exclusive modes are identified at this stage and are statistically characterized in terms of how often they occur. Data movements from external memory to the shared buffers are modeled as processing stages that will happen on the DMA unit. For example, FIGS. 1 and 2 show the various processing stages for a video decoder and a video encoder respectively, where the basic processing unit is a macroblock. An example of mutually exclusive modes is, in a video decoder, whether a macroblock is intra-coded or inter coded, which will decide whether AC/DC prediction should happen or motion compensation processing should happen. Similarly in audio decoding the joint stereo processing modes may be absent or may be based on based on the modes that may go through a different processing stage. FIGS. 3 and 4 show the basic processing blocks for an audio decoder and encoder respectively.

2. Each processing stage is assigned to a particular processing unit (DSP/co-processor/hardware accelerator) based on the suitability and flexibility. Multiple candidates, if found suitable, are identified for later flexibility in scheduling. For example, a multi-MAC co-processor may be ideally suited for computations such as filtering, transforms, mean squared error computation, etc. Similarly from the flexibility point of view, frozen (or normative) parts of a compression standard, can be implemented in a hardware accelerator and non-normative parts (where newer algorithms can be invented) can be kept on a programmable co-processor.

3. Given the inter-dependency between the processing stages, stagger the processing such that all algorithmic dependencies are handled. This means that stages down in the dependency chain may be made to work on past basic units while the stages up in the dependency chain are working on newer basic units. For example, in video encoding, this would mean that motion estimation could be applied on macroblock N, while quantization of DCT coefficients is applied on macroblock N-1, and so on. Similarly for audio decoding the various processing operations like polyphase filtering, transform, windowing can be applied for left channel/granule when Huffman decoding is applied for right channel/granule.

4. Each processing stage on each processing unit is assigned a suitable buffer, for example, based on the constraints that (a) no two units can access the same buffer at the same time and (b) of the three buffers, two buffers are visible mutually exclusively (i.e., each unit can see only one of these two at a given time).

5. For some stages, the complexity is fixed and hence the time taken will be the same. For other stages, the complexity can vary and hence the time taken will also vary. The time taken for the fixed complexity stages and the average time and range of time taken for the varying complexity stages are measured on the respective mapped processing units. Depending on the number of read and write ports on each shared buffer, the time taken will be affected if both read and write happen from the same buffer.

6. Explore the granularity of processing in multiples of the basic unit and select the one that gives the best performance while meeting the platform constraints and dependency constraints. The factors that would influence this include, the savings stemming from going to that granularity, the ability to exploit statistical properties in a reasonably straight-forward fashion, and the amount of memory required in the shared buffers. For example, in video, the granularity could be, say, a macroblock or a group of macroblocks. Similarly in audio, the granularity could be at the level of a frames or channels or granules.

7. Identify the several variations in the staggering that are possible without breaking the dependencies and platform constraints. Some changes in the buffer assignments from step 4 above and the multiple processing unit options for performing a particular processing stage are attempted at this stage. These changes will affect the average timing for processing and need to be properly accounted for. Select a subset of these possible pipelines that offer the best timing (based on the average processing time) for processing at the chosen granularity.

8. Of these selected pipelines, a single pipeline is chosen based on its ability to offer the best overall timing in the presence of statistical variations. For instance, when a particular processing stage has to process N units of data, the worst case may be where the average number of units is m (m=N/2). In a particular pipeline, there may be certain other processing stages scheduled on the other processing units in parallel to the above such that it would not matter whether m units or N units need to be processed. On the other hand, there could be a pipeline where there was processing only in parallel with the first N/2 units and hence can translate to an overall timing reduction on the average.

9. On the chosen pipeline, identify the processing unit that is on the critical path and, if possible, move some tasks that are currently scheduled on this unit and that could be performed on other units.

The following advantageous features of the embodiments described hereinabove are to be noted:

Common to Audio and Video Encoder and Decoders:
1. Multi-threaded pipeline spanning multiple macroblocks (or frame/channel/granule for audio)—setting up dependent data flow over time, breaking up of the various tasks at a sufficient granularity, mapping specific tasks to suitable co-processors (either based on the speedup it offers or the idle time available for further processing), moving around independent tasks to suitable slots in the pipeline to minimize the idle time of co-processors or accelerators on the critical path.
2. Some processing blocks take the same number of cycles every time. However, several processing blocks take a variable number of cycles depending on the complexity of the coding mode. Design of an efficient multi-threaded pipeline in the presence of such variability by (a) pairing tasks on the different units such that the load is roughly balanced, (b) reducing the variability (algorithmically or structurally), is possible.
3. Pre-fetching the necessary data from external memory over DMA to reduce the waiting time.
4. Optimal management of the two image-buffers and the coefficient buffer, given the data dependencies, access constraints and conflict factors.
   Given a limited size for these buffers, designing a desirable macroblock pipeline depth.
   Trading off redundant data movements for efficient relocation of processing tasks.
   Trading losses in conflict factor for keeping more processing units active at a given time.
5. Data arrangements (packed/unpacked, raster-scanned blocks, coefficient preparation for edge handling through reflection, padding, or circular access, etc.) to exploit the order in which the multiple MACs access data like padding the filter coefficients to map from staggered addressing to a regular circular addressing for audio decode.
6. Creating pre-determined sets of command sequences for the programmable co-processor to reduce dynamic setup overhead costs.
   Minimize the number of setups needed from the master DSP by manipulating the control sequence on the co-processors without DSP intervention.

Minimize the number of setup parameters by only configuring the parameter that changes over time.

Advantageous Features Applicable to the Pipeline Design Video Encoder Include:
1. Conditional pipeline that is able to realize an overall processing throughput gain even though certain processing steps are skipped on only one or two co-processors or accelerators (e.g., 3-step ME, CBP-based IDCT or inverse quantization, predicted-as-not-coded, and based skipping).
2. Modifying the macroblock level rate control to run with the multi-threaded macroblock pipeline assumptions (bits consumed from 2 processing units behind, cycle reduction through less precise divisions).
3. Modifying motion estimation to suit the processing constraints (e.g., alternate MB processing, half-pel off, etc.) and memory constraints (e.g. filling entire image buffer with search area for 2 MBs, incremental DMA with circular addressing, and using both image buffers to expand search range.)

Various embodiments of the present subject matter can be implemented in software, which may be run in the exemplary environment shown in FIG. 8 (to be described below) or in any other suitable computing environment. The embodiments of the present subject matter are operable in a number of general-purpose or special-purpose computing environments. Some computing environments include personal computers, general-purpose computers, server computers, hand-held devices (including, but not limited to, telephones and personal digital assistants (PDAs of all types), laptop devices, multi-processors, microprocessors, set-top boxes, programmable consumer electronics, network computers, minicomputers, mainframe computers, distributed computing environments and the like to execute code stored on a computer-readable medium. The embodiments of the present subject matter may be implemented in part or in whole as machine-executable instructions, such as program modules that are executed by a computer. Generally, program modules include routines, programs, objects, components, data structures and the like, to perform particular tasks or to implement particular abstract data types. In a distributed computing environment, program modules may be located in local or remote storage devices.

Figure 8:
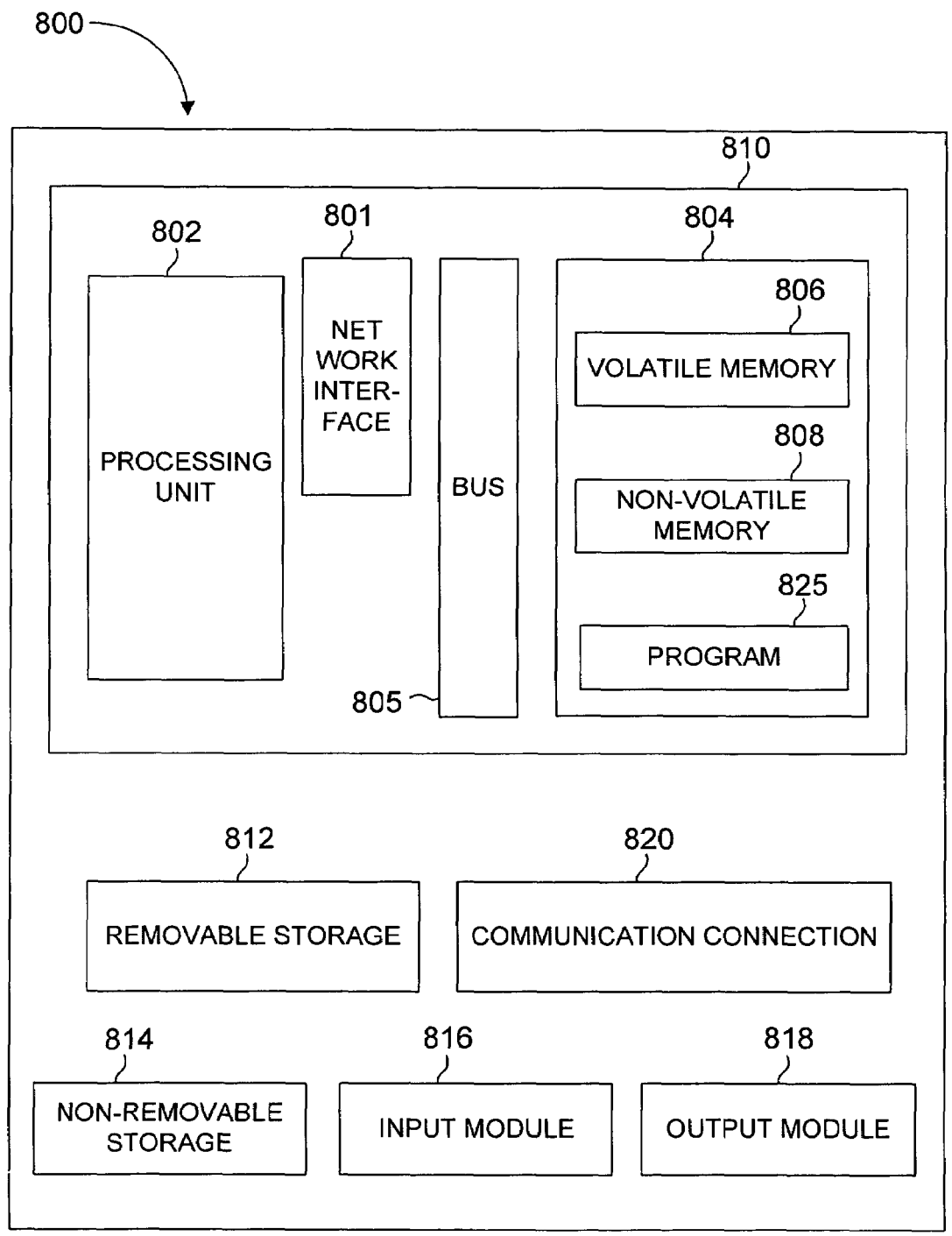
FIG. 8 shows a general purpose computing arrangement applicable in the invention.

FIG. 8 shows an example of a suitable computing system environment for implementing embodiments of the present subject matter. FIG. 8 and the following discussion are intended to provide a brief, general description of a suitable computing environment in which certain embodiments of the inventive concepts contained herein, and particularly, multi-threaded processing pipeline design in an architecture using multiple coprocessors may be implemented.

A general computing device in the form of a computer 810 may include a processing unit 802, memory 804, removable storage 812, and non-removable storage 814. Computer 810 additionally includes a bus 805 and a network interface (NI) 801. Computer 810 may include or have access to a computing environment that includes one or more user input devices 816, one or more output devices 818, and one or more communication connections 820 such as a network interface card or a USB (universal serial bus) connection. The one or more user input devices 816 can be a touch-screen or a stylus and the like. The one or more output devices 818 can be a display device of computer, computer monitor, TV screen, plasma display, LCD display, display on a touch screen, display on an electronic tablet, and the like. The computer 810 may operate in a networked environment using the communication connection 820 to connect to one or more remote computers. A remote computer may include a personal computer, server, router, network PC, a peer device or other network node, and/or the like. The communication connection may include a Local Area Network (LAN), a Wide Area Network (WAN), and/or other networks.

The memory 804 may include volatile memory 806 and non-volatile memory 808. A variety of computer-readable media includes the memory elements of computer 810, such as volatile memory 806 and non-volatile memory 808, removable storage 812 and non-removable storage 814. Computer memory elements can include any suitable memory device(s) for storing data and machine-readable instructions, such as read only memory (ROM), random access memory (RAM), erasable programmable read only memory (EPROM), electrically erasable programmable read only memory (EEPROM), hard drive, removable media drive for handling compact disks (CDs), digital video disks (DVDs), diskettes, magnetic tape cartridges, memory cards, Memory Sticks™, and the like. Alternatively, it can be chemical storage, biological storage, or other types of data storage.

"Processor" or "processing unit," as used herein, means any type of computational circuit, such as, but not limited to, a microprocessor, a microcontroller, a complex instruction set computing (CISC) microprocessor, a reduced instruction set computing (RISC) microprocessor, a very long instruction word (VLIW) microprocessor, explicitly parallel instruction computing (EPIC) microprocessor, a graphics processor, a digital signal processor, or any other type of processor or processing circuit. The term also includes embedded controllers, such as generic or programmable logic devices or arrays, application specific integrated circuits, single-chip computers, smart cards, and the like.

Embodiments of the present subject matter may be implemented in conjunction with program modules, including functions, procedures, data structures, application programs, etc., for performing tasks, or defining abstract data types or low-level hardware contexts. Machine-readable instructions stored on any of the above-mentioned storage media are executable by the processing unit 802 of the computer 810. For example, a computer program 825 may include machine-readable instructions capable of implementing multi-thread processing pipeline design according to the teachings and herein described embodiments. In one embodiment, the computer program 825 may be included on a CD-ROM and loaded from the CD-ROM to a hard drive in non-volatile memory 308. The machine-readable instructions cause the computer 810 to decode according to the various embodiments of the present subject matter.

The various embodiments of the multi-threaded processing pipeline design approach described herein are applicable generally to any parallel processing system, and the embodiments described herein are in no way intended to limit the applicability of the invention. In addition, the techniques of the various exemplary embodiments are useful to the design of any hardware implementations of software, firmware, and algorithms in the context of processing design in general. Many other embodiments will be apparent to those skilled in the art. The scope of this invention should therefore be determined by the appended claims as supported by the text, along with the full scope of equivalents to which such claims are entitled.

The invention claimed is:
1. A method for determining a mapping of a plurality of processing stages to a plurality of processors, which offers overall low average processing time to process input data, in a multimedia codec architecture, comprising the steps of:

identifying a chronological sequence of processing stages for processing said input data including identifying interdependencies of said processing stages;

identifying a set of processing stages from said chronological sequence of processing stages for each of said processors based on suitability of each said processor to perform each of said processing stages;

mapping each said processing stage to a respective processor based on said set of processing stages identified for each processor;

staggering the processing stages for said mapping to accommodate said interdependencies resulting in a pipeline;

ascertaining average processing time for said pipeline associated with said mapping;

repeating the steps of mapping, staggering and ascertaining by changing mappings between the plurality of processing stages and the plurality of processors based on said set of processing stages identified for each processor to obtain a plurality of pipelines;

choosing one design pipeline from said plurality of pipelines that offers overall low average processing time based on each of said mappings; and wherein said mapping of each said processing stage to a respective processor based on said set of processing stages identified for each processor comprises:

assigning one or more data buffers to each processing stage on each processor, based on said interdependencies; and, ensuring that the step of mapping is done based on a constraint that no two processors can access a given buffer simultaneously.

2. The method as in claim 1, wherein said plurality of processors share memory.

3. The method as in claim 1, further comprising identifying one or more processors that are on a critical timing path, and selectively moving at least some tasks from said identified processor to other processors that could perform said moved tasks.

4. The method as in claim 1, wherein said multimedia codec architecture includes video encoding, and wherein said chronological sequence of processing stages includes at least one of motion estimation, motion compensation, forward transform, quantization, inverse quantization, inverse transform and reconstruction.

5. The method as in claim 4, wherein said step of staggering comprises handling input data as group of macroblocks.

6. The method as in claim 1, wherein said multimedia codec architecture includes video decoding, and where said chronological sequence of processing stages includes at least one of: comprising macroblocks (MB) parameters decoding, motion vectors decoding, variable length decoding, inverse quantization, inverse transform, and motion compensation.

7. The method as in claim 1, wherein said processing multimedia codec architecture includes audio decoding, and wherein said chronological sequence of processing stages includes: at least one of header parameters decoding, and variable length decoding, inverse quantization, inverse transform and windowing.

8. The method as in claim 7, of further comprising providing data arrangements to exploit order in which multiple MACs (multiply and accumulate units) access data for audio decoding.

9. The method as in claim 1, wherein said processing multimedia codec architecture includes audio encoding and wherein said chronological sequence of processing stages includes psycho acoustic modeling, filtering by masking, sub-band decomposition, transform quantization and variable length encoding.

10. The method as in claim 1 wherein said multiprocessors include coprocessors and accelerators.

11. The method as in claim 10, further comprising mapping processing stages as tasks on different coprocessors so as to achieve substantially balanced load.

12. The method as in clam 10, further comprising creating predetermined sets of command sequences for programmable coprocessors, to reduce dynamic set up overhead costs.

13. The method as in claim 10, wherein said chosen design pipeline is a conditional pipeline that realizes overall processing throughput gain even though certain processing steps are skipped on one or more coprocessors/accelerators.

14. The method as in claim 10, wherein said plurality of processors includes a DSP, coprocessor and hardware accelerator, and wherein a multi-MAC coprocessor is assigned to do computations including filtering, transforms, and mean squared error computation, and assigning a programmable coprocessor to do non-normative tasks.

15. The method as in claim 1 further comprising fetching/storing necessary data from/to external memory over DMA (direct memory access) to reduce waiting time.

16. The method of claim 1, wherein the multimedia codec architecture includes a master processor and a set of coprocessors or accelerators, of and minimizing a number of set-ups needed from said master processor by manipulating a control sequence on said coprocessors without master processor's intervention.

17. A method for achieving efficient parallel processing multi-thread-design-capability in architecture which uses multiple processing units and is capable of handling multimedia encoding/decoding, comprising the steps of:

identifying a chronological sequence of processing stages for processing input data and their interdependencies during processing of said input data;

identifying a set of processing stages from said chronological sequence of processing stages for each of said processing units based on suitability of each said processing unit to perform each of said processing stages;

mapping each said processing stage to a respective processing unit based on said set of processing stages identified for each processing unit, wherein said mapping comprises:

assigning a buffer, by mapping, to each processing unit for each processing stage; and ensuring that no two processing units can simultaneously access a given buffer;

staggering said processing stages for said mapping to accommodate said interdependencies resulting in a pipeline;

ascertaining average processing time needed, on respective mapped processing units, said pipeline;

repeating the steps of mapping, staggering and ascertaining by changing mappings between the plurality of processing stages and the plurality of processing units based on said set of processing stages identified for each processing unit to obtain a plurality of pipelines; and, from the plurality of pipelines, selecting a single design pipeline that offers overall low average processing time based on each of said mappings.

18. The method as in claim 17, including listing mutually exclusive modes of said processing stages including a frequency of occurrence of said listed mutually exclusive modes.

19. The method as in claim 17, including, using shared buffers and moving data from an external memory to said shared buffers in said processing stages.

20. The method as in claim 17, including, on said selected design pipeline, identifying a processing unit that uses said best timing and is on a critical path, and moving away any tasks currently scheduled on the identified processing unit, if such tasks can be performed on other processing units.

21. An article comprising a computer-readable media having instructions that when executed by a computing platform result in execution of a method for determining a mapping of a plurality of processing stages to a plurality of processors, which offers overall low average processing time to process input data, in a multimedia codec architecture, comprising the steps of:

identifying a chronological sequence of processing stages for processing said input data including identifying interdependencies of said processing stages;

identifying a set of processing stages from said chronological sequence of processing stages for each of said processors based on suitability of each said processor to perform each of said processing stages;

mapping each said processing stage to a respective processor based on said set of processing stages identified for each processor;

staggering the processing stages for said mapping to accommodate said interdependencies resulting in a pipeline;

ascertaining average processing time for said pipeline associated with said mapping;

repeating the steps of mapping, staggering and ascertaining by changing mappings between the plurality of processing stages and the plurality of processors based on said set of processing stages identified for each processor to obtain a plurality of pipelines; and, choosing one design pipeline from said plurality of pipelines that offers overall low average processing time based on each of said mappings; and wherein said mapping each said processing stage to a respective processor comprises:

assigning one or more data buffers to each processing stage on each processor, based on said interdependencies; and, ensuring that the step of allocating mapping is done based on a constraint that no two processors can access a given buffer simultaneously.

22. An article comprising a computer-readable media having instructions that when executed by a computing platform result in execution of a method for achieving efficient parallel processing multi-thread-design-capability in architecture which uses multiple processing units and is capable of handling multi-media encoding/decoding, comprising the steps of:

identifying a chronological sequence of processing stages for processing input data including identifying interdependencies of said processing stages;

identifying a set of processing stages from said chronological sequence of processing stages for each of said processing units based on the suitability of each said processing unit to perform each of said processing stages;

mapping each said processing stage to a respective processing unit based on said set of processing stages identified for each processing unit, wherein said mapping comprises:

assigning a buffer, by mapping, to each processing unit for each processing stage; and ensuring that no two processing units can simultaneously access a given buffer;

staggering the processing stages for said mappings to accommodate said interdependencies resulting in a pipeline;

ascertaining average processing time needed, on respective mapped processing units, for said pipeline;

repeating the steps of mapping, staggering and ascertaining by changing mappings between the plurality of processing stages and the plurality of processing units based on said set of processing stages identified for each processing unit to obtain a plurality of pipelines; and, choosing one design pipeline from said plurality of pipelines that offers overall low average processing time based on each of said mappings.

* * * * *